(12) United States Patent
Larson

(10) Patent No.: US 7,300,575 B2
(45) Date of Patent: *Nov. 27, 2007

(54) PORTABLE FILTER SYSTEM

(75) Inventor: Doug Larson, River Forest, IL (US)

(73) Assignee: Heritage Crystal Clean, LLC, Elgin, IL (US)

( * ) Notice: Subject to any disclaimer, the term of this patent is extended or adjusted under 35 U.S.C. 154(b) by 298 days.

This patent is subject to a terminal disclaimer.

(21) Appl. No.: 10/869,278

(22) Filed: Jun. 16, 2004

(65) Prior Publication Data

US 2005/0279717 A1    Dec. 22, 2005

(51) Int. Cl.
*B01D 36/04* (2006.01)

(52) U.S. Cl. ............... 210/167.04; 210/171; 210/259; 210/262; 210/532.1; 210/533; 210/540; 210/799; 210/DIG. 5

(58) Field of Classification Search .............. None
See application file for complete search history.

(56) References Cited

U.S. PATENT DOCUMENTS

| | | | | | |
|---|---|---|---|---|---|
| 1,455,927 | A | * | 5/1923 | Morison | 137/1 |
| 1,743,966 | A | * | 1/1930 | Goudard | 137/80 |
| 1,883,139 | A | * | 10/1932 | Walter | 137/101.25 |
| 1,994,372 | A | * | 3/1935 | Smith | 210/195.1 |
| 2,059,716 | A | * | 11/1936 | Swinburne | 137/13 |
| 2,191,019 | A | * | 2/1940 | Johnson | 137/8 |
| 2,225,498 | A | * | 12/1940 | Hollander | 137/123 |
| 2,288,503 | A | * | 6/1942 | Weaver | 205/484 |
| 2,508,170 | A | * | 5/1950 | Kaufmann | 137/89 |
| 2,629,689 | A | * | 2/1953 | Green et al. | 210/715 |
| 2,901,114 | A | * | 8/1959 | Smith et al. | 210/200 |
| 3,239,438 | A | * | 3/1966 | Voorhees | 205/673 |

(Continued)

Primary Examiner—Robert James Popovics
(74) Attorney, Agent, or Firm—Levenfeld Pearlstein

(57) ABSTRACT

A filter system for receiving an aqueous-based fluid contaminated with particles and emulsified contaminant oil, removing the particles, and separating the emulsified contaminant oil from the aqueous-based fluid includes a filter media for receiving the aqueous-based fluid and emulsified contaminant oil, having an inner filter element formed from a 95 percent single pass efficiency 48 micron (5 micron nominal) filtering material of needle punch polypropylene felt, an outer filter element formed from a 95 percent single pass efficiency 19 micron absolute filtering material of a polypropylene microfiber material and a porous spunbond polypropylene sandwiching the outer filter media. The filter element removes particles, de-emulsifies the emulsified contaminant oil from the aqueous-based fluid into the contaminant oil and the aqueous-based fluid, separates the de-emulsified contaminant oil from the aqueous-based fluid, coalesces the separated contaminant oil and passes both the coalesced de-emulsified contaminant oil with entrained particles and the aqueous-based fluid. A first tank supports the filter element and is further configured to hold a quantity of the separated coalesced contaminant oil and the aqueous-based fluid. The first tank has a first outlet passing the aqueous-based fluid from the first tank to near the bottom of the second tank and a second outlet passing the separated coalesced contaminant oil to the top of the second tank. The second tank has an oil separation assembly for separating the aqueous-based fluid from the contaminant oil and passing the aqueous-based fluid therefrom. The second container also has a drain valve assembly for removing only the accumulated coalesced de-emulsified contaminant oil. A method for separating the emulsified contaminant oil from the aqueous-based fluid and recovering the aqueous-based fluid is also disclosed.

19 Claims, 12 Drawing Sheets

U.S. PATENT DOCUMENTS

| | | | | |
|---|---|---|---|---|
| 3,289,846 A * | 12/1966 | Warrington et al. | ........ | 210/232 |
| 3,563,888 A * | 2/1971 | Klock | ........ | 210/617 |
| 3,624,665 A * | 11/1971 | Klingle, Sr. | ........ | 4/459 |
| 3,666,106 A * | 5/1972 | Green | ........ | 210/201 |
| 3,733,264 A * | 5/1973 | Spector et al. | ........ | 210/604 |
| 3,774,768 A * | 11/1973 | Turner | ........ | 210/199 |
| 3,784,470 A * | 1/1974 | Richardson et al. | ... | 210/321.87 |
| 3,824,632 A * | 7/1974 | Bach et al. | ........ | 4/318 |
| 3,870,634 A * | 3/1975 | Humphrey | ........ | 210/220 |
| 3,922,208 A * | 11/1975 | Cordone et al. | ........ | 205/97 |
| 3,941,147 A * | 3/1976 | Kaup et al. | ........ | 137/453 |
| 3,951,816 A * | 4/1976 | Bascope et al. | ........ | 210/519 |
| 3,987,816 A * | 10/1976 | Lange | ........ | 137/563 |
| 4,036,760 A * | 7/1977 | Bardonnet et al. | ........ | 210/323.1 |
| 4,090,530 A * | 5/1978 | Lange | ........ | 137/563 |
| 4,104,167 A * | 8/1978 | Besik | ........ | 210/195.1 |
| 4,176,068 A * | 11/1979 | Ankersmit | ........ | 210/295 |
| 4,253,957 A * | 3/1981 | Sullivan | ........ | 210/195.3 |
| 4,925,555 A * | 5/1990 | Spielberg | ........ | 210/137 |
| 4,933,076 A * | 6/1990 | Oshima et al. | ........ | 210/151 |
| 5,202,023 A * | 4/1993 | Trimmer et al. | ........ | 210/321.8 |
| 5,203,367 A * | 4/1993 | Akai et al. | ........ | 137/101.25 |
| 5,431,827 A * | 7/1995 | Tatch | ........ | 210/767 |
| 5,478,465 A * | 12/1995 | Larson et al. | ........ | 210/167 |
| 5,582,743 A * | 12/1996 | Larson et al. | ........ | 210/804 |
| 5,626,758 A * | 5/1997 | Belfort | ........ | 210/636 |
| 5,843,305 A * | 12/1998 | Kim et al. | ........ | 210/151 |
| 5,922,064 A * | 7/1999 | Gordon, Sr. | ........ | 210/519 |
| 5,985,151 A * | 11/1999 | Ahmadi | ........ | 210/650 |
| 6,123,838 A * | 9/2000 | Grossman | ........ | 210/97 |
| 6,165,359 A * | 12/2000 | Drewery | ........ | 210/195.1 |
| 6,203,707 B1 * | 3/2001 | Hartmann | ........ | 210/650 |
| 6,322,694 B1 * | 11/2001 | Iliadis et al. | ........ | 210/167.01 |
| 6,331,249 B1 * | 12/2001 | Nelson et al. | ........ | 210/610 |
| 6,391,198 B1 * | 5/2002 | Porter et al. | ........ | 210/241 |
| RE37,759 E * | 6/2002 | Belfort | ........ | 210/636 |
| 6,592,753 B2 * | 7/2003 | Lee | ........ | 210/112 |
| 6,607,663 B1 * | 8/2003 | Dixon | ........ | 210/195.2 |
| 6,808,622 B2 * | 10/2004 | Okamoto et al. | ........ | 210/151 |
| 6,818,126 B2 * | 11/2004 | Larson | ........ | 210/168 |
| 6,932,910 B2 * | 8/2005 | Miller | ........ | 210/743 |
| 6,966,443 B1 * | 11/2005 | Ridge | ........ | 210/446 |
| 7,060,189 B2 * | 6/2006 | Miller | ........ | 210/743 |
| 7,074,337 B2 * | 7/2006 | Miller | ........ | 210/744 |
| 7,175,758 B2 * | 2/2007 | Miller | ........ | 210/97 |
| 7,179,372 B2 * | 2/2007 | Miller | ........ | 134/10 |
| 2003/0178377 A1 * | 9/2003 | Larson | ........ | 210/799 |
| 2004/0094490 A1 * | 5/2004 | Miller | ........ | 210/805 |
| 2005/0029200 A1 * | 2/2005 | Miller | ........ | 210/743 |
| 2005/0082238 A1 * | 4/2005 | Larson | ........ | 210/799 |
| 2005/0230325 A1 * | 10/2005 | Miller | ........ | 210/770 |
| 2005/0279717 A1 * | 12/2005 | Larson | ........ | 210/799 |
| 2006/0180530 A1 * | 8/2006 | Miller | ........ | 210/167 |
| 2006/0207947 A1 * | 9/2006 | Miller | ........ | 210/743 |

* cited by examiner

PORTABLE FILTER SYSTEM

FIELD OF THE INVENTION

The present invention concerns a filter device suited for separating oil from water based fluids and filtering particles out of the water based fluids. More particularly the present invention concerns a particle filtration, de-emulsification, oil coalescing, oil collecting and gravity separation system that uses a microfiber polymer filter media in a coiled tubular arrangement in association with means to de-emulsify and separate fluids by density and permit separated fluids to flow separately into a final separation location, such that re-emulsification of the desired fluid with the contaminant is lessened.

BACKGROUND OF THE INVENTION

Devices, systems and methods for the removal of particles, free oil (such as dispersed, finely divided oil droplets), and emulsified oil contaminants in aqueous fluids is in widespread use in all types of commercial and industrial facilities. Known devices include cartridge and bag filters either permanently installed or as a part of portable systems, conventional oil coalescing systems that require many stages, baffles, filters, and weirs to coalesce and then separate and accumulate the coalesced oil, membrane filtration systems that concentrate emulsified oils and particles in an aqueous fluid for disposal, centrifuges that separate oil and particles due to their different densities, and conventional oil skimmers that use the higher viscosity of oils to remove oils in aqueous fluid sumps or baths after the oil droplets begin to coalesce due to time and gravity. Known methods also include periodically pumping out the old fluid and pumping in new fluid, periodically filtering the contaminated fluid over a relatively short period of time with portable filtration equipment in a dialysis mode, and filtering the contaminated fluid in an in-line mode at the aqueous fluid process flow rates.

However, each of these known devices, systems and methods, has its drawbacks. For example, in-line cartridge and bag filters are subject to blinding by oil emulsions and contaminants and require high-pressure pumps and housings. Oil coalescing systems are relatively expensive and difficult to clean and usually require a relatively large dedicated floor space, and do not remove emulsified tramp oils.

Membrane filters are unreliable due to their sensitivity to fouling by various contaminants and damage by pH and temperature. Membrane filters remove coalesced oils by holding back the oil and allowing aqueous fluids to pass through the filter. This concentrates the emulsion on one side of the membrane. As the concentration of oil increases, the efficiency of the filtration system decreases (due to increased resistance across the membrane) and the membrane becomes increasingly susceptible to fouling.

Centrifugal separation systems involve rapidly spinning elements to create the necessary centrifugal force, which can present safety concerns, and are relatively expensive.

Periodic change-out of the coolant results in labor time and costs, machine downtime, coolant costs and disposal costs. Periodic dialysis filtration in which the fluid is pumped out, filtered (either by centrifugal or conventional filtration) and returned to the sump requires labor to move from sump to sump. Moreover, once the coolant is periodically changed or filtered, it begins accumulating unwanted contaminants such that the quality of the coolant continually degrades until the next periodic change-out or filtration.

Various attempts have been made to reduce fouling in membrane filters. These include using spinning discs near the surface of the membrane; however, these disks require relatively large amounts of energy and generate heat in the fluid. Moreover, membrane pore sizes are such that bacteria concentrate with the emulsion. The heat generated from the antifouling mechanisms tends to colonize bacteria and create offensive odors. Further, membrane filtration systems cannot be used to filter emulsified oil coolants for reuse because the membrane removes the desired oil-in-water emulsion which blinds (clogs or fouls) the membrane.

With respect to oil-in-water emulsions, these are liquid systems that are particularly difficult to filter. Such liquid systems include, for example, coolant systems having a (desired) oil droplet "surrounded" by coolant. That is, the oil-in-water forms a micelle-like liquid system with a desirable oil in the nucleus of the micelle with the coolant surrounding the oil nucleus. The "desirable" oil may be, for example, a particular lubricating oil. In such systems, tramp oils such as (other, undesirable) lubricating oils, hydraulic fluids and part coating oils (collectively contaminants) may be present in the coolant system. These contaminants adhere or attach to the outer liquid of the system. It is these contaminants that must be removed, without removing the desirable oils.

Oil skimmers are essentially a remediation strategy to remove unwanted oils after they have become a problem. Floating oils typically prevent the movement of oxygen and create an environment for the cultivation of anaerobic bacteria. Floating oils can also form dry floating patches of material that are not effectively picked up by conventional skimming techniques. Furthermore, oil skimmers do not remove emulsified tramp oils. The emulsified oils can also become food to cultivate bacteria as well as change the cooling and machining enhancement properties of the coolant.

Accordingly, there is a need for a filter system that is less susceptible to fouling and that can remove unwanted contaminants. Desirably, such a filter system is configured to allow contaminants to first pass over a used area of the filter prior to exposing the contaminants to unexposed areas of the filter. Most desirably, such a filter system increases the ability of oil and particulate contaminants to be removed without prematurely blinding the filter media. Such a system most desirably operates at low-pressure differentials to promote high efficiency and to eliminate the need for high-pressure pumps and additional structural elements to support these higher operating pressures. It is a further desire that the separated contaminants are collected in a way that permits easy removal.

SUMMARY OF THE INVENTION

In accordance with the present invention a filter system for receiving an aqueous-based fluid (by itself or as part of an oil-in-water emulsion) contaminated with particles and emulsified contaminant oil, and separating the particles and emulsified contaminant oil from the aqueous-based fluid includes a filter media for receiving the aqueous-based fluid, particles, and emulsified contaminant oil. The filter media has a tubular inner filter element formed from a 5 micron nominal, 48 micron 95 percent efficiency single pass filtering material of needle punch polypropylene felt, a tubular outer filter element formed from a 19 micron 95 percent efficiency single pass filtering material of a polypropylene microfiber material and a porous spunbond polypropylene sandwiching the outer filter media.

The filter element de-emulsifies the emulsified contaminant oil from the aqueous-based fluid into the contaminant oil and the aqueous-based fluid, coalesces the de-emulsified contaminant oil, separates the coalesced de-emulsified contaminant oil from the aqueous-based fluid, and passes both the coalesced de-emulsified contaminant oil and the aqueous-based fluid.

A first container supports the filter element, the first container is further configured to hold a quantity of the coalesced de-emulsified contaminant oil and the aqueous-based fluid. The first container includes overflow outlets passing to a second container. In a preferred embodiment, the overflow outlets comprise a first outlet conduit, or primary opening, comprising a transfer tube having a first end further comprising a tee fitting having a generally vertically directed length of pipe with an opening near the bottom such that only fluids near the bottom, within the first canister, can flow out of the canister into the transfer tube having a second end directed into a low level position within a second container, or oil trap. The filter system further comprises a second outlet conduit comprising a transfer tube having a first end defining an upwardly facing opening positioned above the upper surface of the first canister and a second end directed to an upper level of the second container, or oil trap.

As a result of the two outlet system, the floating oil accumulating in the filter canister will not be able to exit from the filter canister until the height of the combined fluids within the first canister exceeds the height of the upward facing entrance to the second outlet. By properly positioning the second outlet through the side of the filter canister above the first outlet opening and directing the transfer tube into the top of the oil trap, only accumulated coalesced oil in the filter canister will exit from the second outlet into the oil trap. The aqueous fluid will continue to exit out of the primary opening and pass through the transfer tube connecting the filter canister and the oil trap and flow into the lower position of the oil trap or second container.

The second canister has an oil separation assembly for separating the aqueous-based fluid from the contaminant oil and passing the aqueous-based fluid therefrom. In a present system, the oil separation assembly includes a vertical conduit extending to about the bottom of the second canister and a tee in flow communication with the vertical conduit. The tee provides flow communication from the second canister such that the aqueous-based fluid flows upward into the vertical conduit, into the tee and out of the second canister. The lighter coalesced oil, however, floats on top of the aqueous-based fluid in the second tank and is precluded from exiting the second tank until the oil depth exceeds the depth of the vertical conduit.

Preferably, the aqueous-based fluid is recovered and reused. The contaminant oil is also recovered for subsequent treatment and/or disposal.

In a preferred embodiment, the depth of the downward directed pipe in the oil trap, connected to the transfer tube for the first or primary opening in the filter canister, is made the same depth as a downwardly directed pipe connected to the outlet of the oil trap, the aqueous fluid from the primary outlet in the filter canister will not flow together with the oil from the secondary outlet in the filter canister. As a result, the oil will statically accumulate in the oil trap canister, minimizing the ability of the aqueous fluid to re-emulsify the separated oil.

The filter system can include an over-pressurization arrangement to prevent over-pressurizing the filter media.

In another preferred embodiment, a means for draining contaminant oil only out of the oil trap using a siphon principle is used. A valve connected to a length of hose is connected to an elbow on the outside of the oil trap to a nipple which passes through the oil trap to an elbow seated with a gasket to the inside of the oil trap. The downward directed elbow inside the oil trap has a 1½" nipple which allows the oil trap to drain to a level below the height of the receiving container using a siphon principle. The siphon principle also shuts off the flow abruptly once the oil level drops to the level of the opening to the inlet nipple inside the oil trap and the siphon is broken. While a specific embodiment of elements of the preferred embodiment are described it will be understood by persons having ordinary skill in the art that other elements and sizes can be utilized, for a desired outcome, without departing from the novel scope of the present invention.

A method for separating an aqueous-based fluid from a liquid system having an aqueous-based fluid contaminated with an emulsified contaminant oil includes the steps of introducing the aqueous-based fluid contaminated with the emulsified contaminant oil through a filter media to form an aqueous-based fluid and a separated contaminant oil stream, passing the aqueous-based fluid through the filter media, passing the contaminant oil through the filter media, separating the aqueous-based fluid from the contaminant oil, recovering the aqueous-based fluid and accumulating the contaminant oil for easy removal.

The present systems use the natural ability of the coiled tubular filter configuration to de-emulsify and coalesce oils and makes use of gravity to facilitate separating and accumulating the coalesced oils, in a container, for ease of removal. A present system can be provided in a modular design having a relatively small footprint, which provides a cost effective, machine-dedicated system for example, for parts cleaners, machine tools and the like. Moreover, the present de-emulsifying/coalescing coiled tubular filter system is less susceptible to fouling and bacteria colonization than membrane filters because the coalesced oil, aqueous fluid, small particles contained in the oil and bacteria pass through the filter, and become entrapped in the coalesced oil.

The present system further utilizes the natural tendency of oil to separate and float above water to separate these heavier and lighter fluids into separate layers of the fluid mixture in the second tank, so as to lessen the likelihood of the re-emulsion of the oil into the aqueous-based fluid.

It is believed that particles between 1-20 microns, and preferably 19 microns, will be entrapped within the de-emulsified and coalesced tramp oil resulting in a single pass 95% removal efficiency of particles greater than 1 micron with a filter media which has a 95% removal efficiency of particles greater than 19 microns.

These and other features and advantages of the present invention will be apparent he following detailed description, in conjunction with the appended claims.

DETAILED DESCRIPTION OF THE INVENTION

Figure 1:
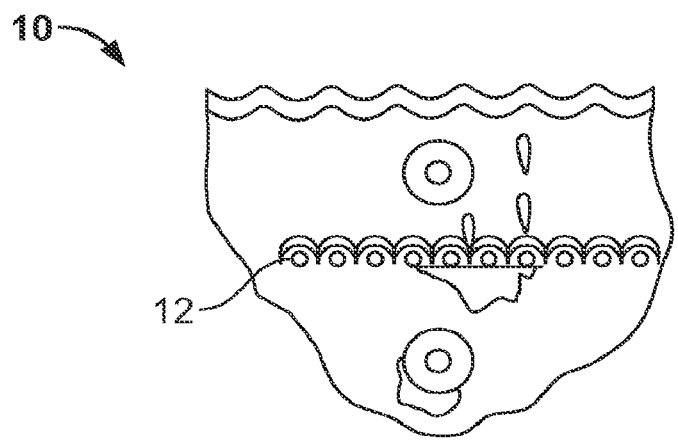
FIG. 1 illustrates the phenomena of de-emulsifying, filtration and coalescing as carried out by the present filter system.
Figure 2:
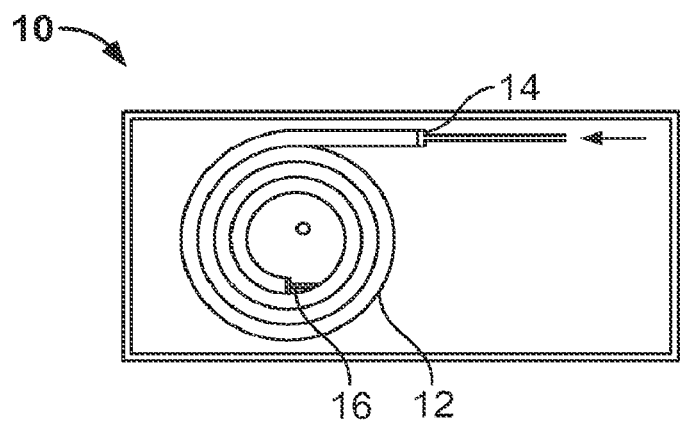
FIGS. 2 and 3 are plan and elevational views of one embodiment of the de-emulsifying/coalescing coil tubular filter embodying the principles of the present invention.
Figure 3:
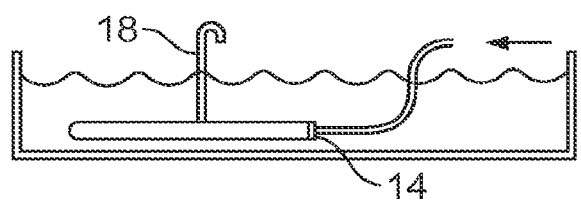

While the present invention is susceptible of embodiment in various forms, there is shown in the drawings a number of presently preferred embodiments that are discussed in greater detail hereafter. It should be understood that the present disclosure is to be considered as an exemplification of the present invention, and is not intended to limit the invention to the specific embodiments illustrated. It should be further understood that the title of this section of this application ("Detailed Description of the Invention") relates to a requirement of the United States Patent Office, and should not be found to limit the subject matter disclosed herein.

Referring to the figures, there is shown several embodiments of a de-emulsifying/coalescing coiled tubular filter system 10. The system 10 is configured to receive a contaminated liquid stream, such as an oil-in-water emulsion, de-emulsify the contaminants from the emulsion and pass both the contaminants and the emulsion through a filter 12, such that the contaminants and the emulsion remain separated from one another with the contaminants being coalesced and passed as seen in FIG. 1.

Figure 4:
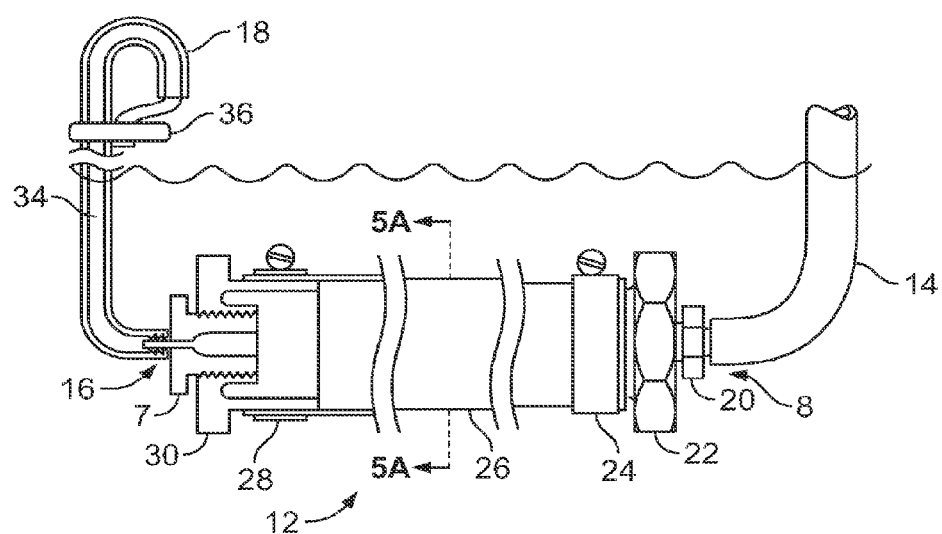
FIG. 4 is a partial view of the filter system illustrating one way in which the filter media can be connected to the overall system.

Referring to FIG. 4, the de-emulsifying/coalescing coiled tubular filter system 10 includes the coiled tubular filter 12 media having an inlet fitting 8 and an outlet fitting 16 connected to the tubular filter 12 media at each end. The fittings 8, 16 can be connected by, for example, conventional hose clamps. The inlet fitting 8 connects the coiled tubular filter 12 to the fluid to be filtered. The outlet fitting 16 connects a filter change indicator 18 which is formed from of a length of tubing having an open end elevated a predetermined distance above the filtered fluid. Optionally, and preferably, a pressure gauge and bypass and/or relief valve is used. The change indicator 18 provides a controlled backpressure to the filter 12, a visual and measurable indicator of backpressure, and a bypass to maintain fluid flow and prevent over pressurizing the filter element. Again, optionally and preferably, a pressure gauge and bypass is used to prevent over-pressurization.

Referring again to FIG. 4, the de-emulsifying/coalescing coiled tubular filter 12 includes an inlet hose 14, hose to thread adapter 20, thread to pipe adaptor 22, inlet hose clamp 24, tubular filter material 26, outlet hose clamp 28, outlet pipe to thread adaptor 30, outlet thread to hose adapter 7, bypass pressure relief tube 34, and bypass pressure relief opening 36. Preferably, as set forth above, instead of the tube 34 and opening 36 arrangement, a pressure gauge and relief valve (not shown) are used to prevent system 10 over-pressurization. A cross-sectional view of the filter shown in FIG. 5B illustrates the normal shape of the tube filter 12 as a collapsed flat. The tube 12 is made by folding one or more strips of material or materials and either heat sealing or sewing the edges 38 to one another. FIG. 5C shows an alternate construction in which two strips of material are either heat sealed or sewn along both edges 38a and 38b. The double edge construction provides a stronger bias to maintain the two surfaces of filter material together.

Figure 5A:
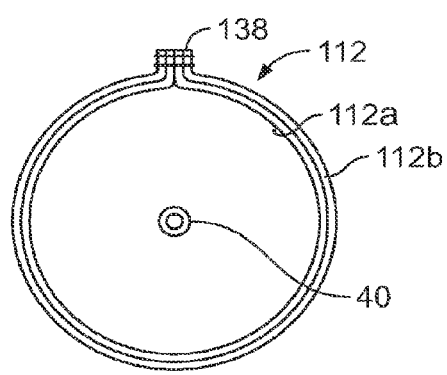
FIGS. 5A-5E are still other views of the filter illustrated in cross-section and showing various alternate seam arrangements.
Figure 5B:
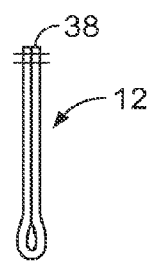
Figure 5C:
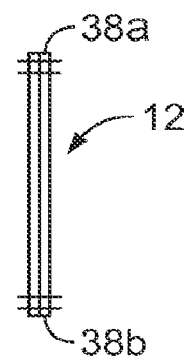

FIG. 5A illustrates a cross-sectional view of one embodiment of the de-emulsifying/coalescing coiled tubular filter 112. The filter 112 is formed having an inner filter 112a and an outer filter 112b. In a current embodiment, the inner filter 112a is fabricated from a 48 micron 95 percent efficiency single pass (5 micron nominal) needle punch polypropylene material, and the outer filter 112b is made out of a 19 micron 95 percent efficiency single pass microfiber polypropylene that is sandwiched between layers of spunbond polypropylene to retain any loose microfibers. The layers of filter media 112a, 112b are formed into a tubular configuration by joining the longitudinal edges 138 to one another and forming a seam. In the present embodiment, the seam is a standard industrial sewn seam. However, other seaming methods such as gluing, ultrasonic welding, vibratory friction welding, heat welding and the like are contemplated.

Figure 5D:
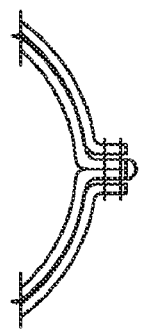
Figure 5E:
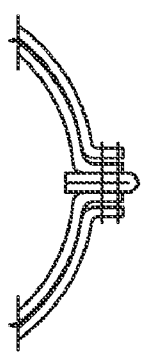

FIGS. 5D and 5E illustrate still other alternate seam seals that are used to prevent leakage through the seam holes. When the filter 12, 112 becomes pressurized the forces are such that the seam threads may start to elongate the thread holes, thus creating a small leak path. FIG. 5E shows an embodiment in which the seam seal is a triple folded strip of polyethylene film (about 6 mil ($6/1000$) inch thick) that is sandwiched between the two layers of the inner filter. FIG. 5D shows an embodiment in which a strip of polyethylene is wrapped over the seam of the inner filter. In both embodiments, the seal strip material is sufficiently elastic to seal around the seam threads. The strips are located such that they "float" and are unaffected by the stresses in the filter media when the filter becomes pressurized.

In a present embodiment, the de-emulsifying/coalescing coiled tubular filter 12, 112 has ¼" ID×⅜" OD high density polyethylene (HDPE) tubing 40 running almost all of its length. The filter tubing 40 is approximately 8" shorter than the de-emulsifying/coalescing tubular filter 12 media to allow for the attachment of the inlet fitting 8 and outlet fitting 16. In the preferred embodiment, the filter tubing 40 has a natural coiled shape to impart a coiled shape to the coiled tubular filter 12 media. The filter tubing 40 also prevents the coiled tubular filter 12 media from kinking. The inner filter 112a removes particles and absorbs free floating heavy oils and greases to prevent premature blinding of the much finer outer filter 112b.

The inner filter 112a has a 95 percent single pass filtration efficiency of 48 microns and the outer filter 112b has a 95 percent single pass filtration efficiency of 19 microns. Finally, the outer filter 112b is made out of a material capable of de-emulsifying, adsorbing, and coalescing water-in-oil emulsions (dark colored fluids) while passing oil-in-water emulsions (milky colored fluids).

FIGS. 6A-6F show an aqueous filtration unit having means to segregate oil separated in the filter so that the oil can not be easily re-emulsified into the aqueous fluid. The filter system, 10 includes the coiled filter 12 present in a filter reservoir 52, the 45° elbow 60 and inlet union 62. The coalesced oil from the de-emulsifying/coalescing tubular filter 12 overflows into the oil/water separator 54 through overflow 90 where the oil is trapped by the oil trap 57. The oil trap 57 includes a tee fitting 64 with an upper pipe 66 and lower pipe 68. The upper pipe 66 acts as a vent to prevent siphoning fluid from the oil/water separator 54. The lower pipe 68 prevents passage of floating oil. The transfer tube from the filter reservoir 52 to the oil/water separator 54 includes a downwardly extending standpipe 71 and a vent 69. The standpipe opens at a level near the bottom of the oil trap to prevent contact with the accumulated oil 200 and re-emulsifying of the oil in the aqueous-based fluid.

Figure 6A:
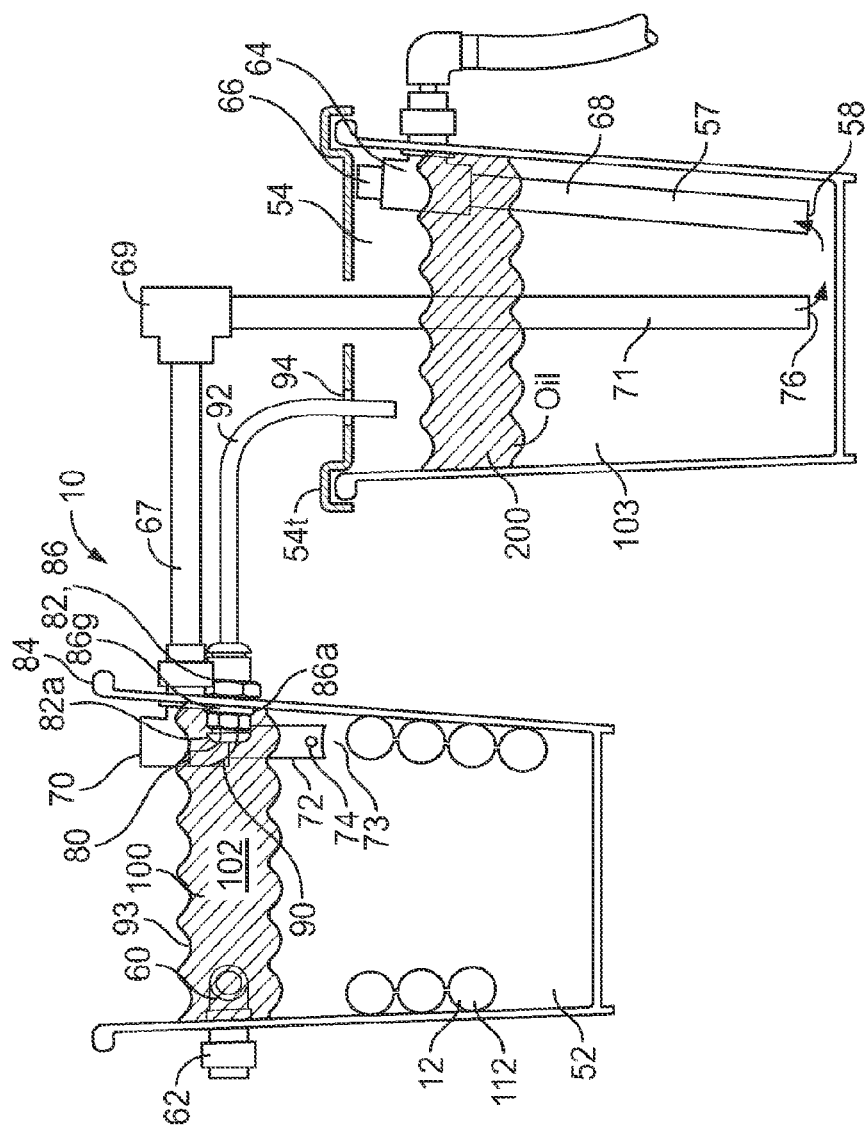
FIG. 6A is a sectional view of an improved filter of the present invention.
Figure 6B:
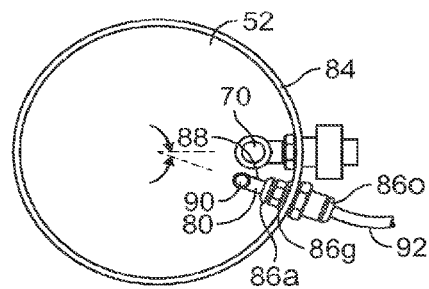
FIG. 6B is a top plan view of the improved filter of FIG. 6A.

Referring to FIG. 6A, it can be seen that in one preferred embodiment of the device of the present invention, oil once split off from the aqueous fluid is allowed to accumulate in the oil trap along with the aqueous fluid via separate paths. Advantageously, such a configuration prevents the coalesced de-emulsified oil produced by the filter 12 from flowing with the aqueous fluid and becoming partially re-emulsified.

It can be seen, in FIG. 6A, that an outlet tee 70 comprises a downward directed length of pipe 72. The pipe 72 may have holes or slots 74 to help insure that aqueous fluid is able to enter the pipe 72 even if the coiled filter material inside the filter canister shifts and blocks the bottom opening 73 at the end of the pipe 72. The aqueous fluid that enters the pipe 72 passes through the tee 70 and into the transfer tube assembly 67. The transfer tube assembly 67 has a downwardly directed pipe 71 that, in a preferred embodiment has a length of approximately 16". It will be understood by persons having ordinary skill in the art that the length of pipe 71, and the other pipes and conduits, as well as their diameters and other specifications, will depend on the concomitant sizes, shapes and specifications, of the other parts and equipment used in a configuration of the particular embodiment of the device. The use of different sized pipes, conduits and other equipment, as well as the specifications for materials and connections, are contemplated in the present invention and their uses are not a departure from the novel scope of the present invention.

FIG. 6A shows that the bottom outlet 76 of the downward directed pipe 71 of the transfer tube assembly 67 is approximately at the same level as the bottom opening 58 in the downward directed outlet pipe 68 in the oil trap assembly 54.

Figure 6C:
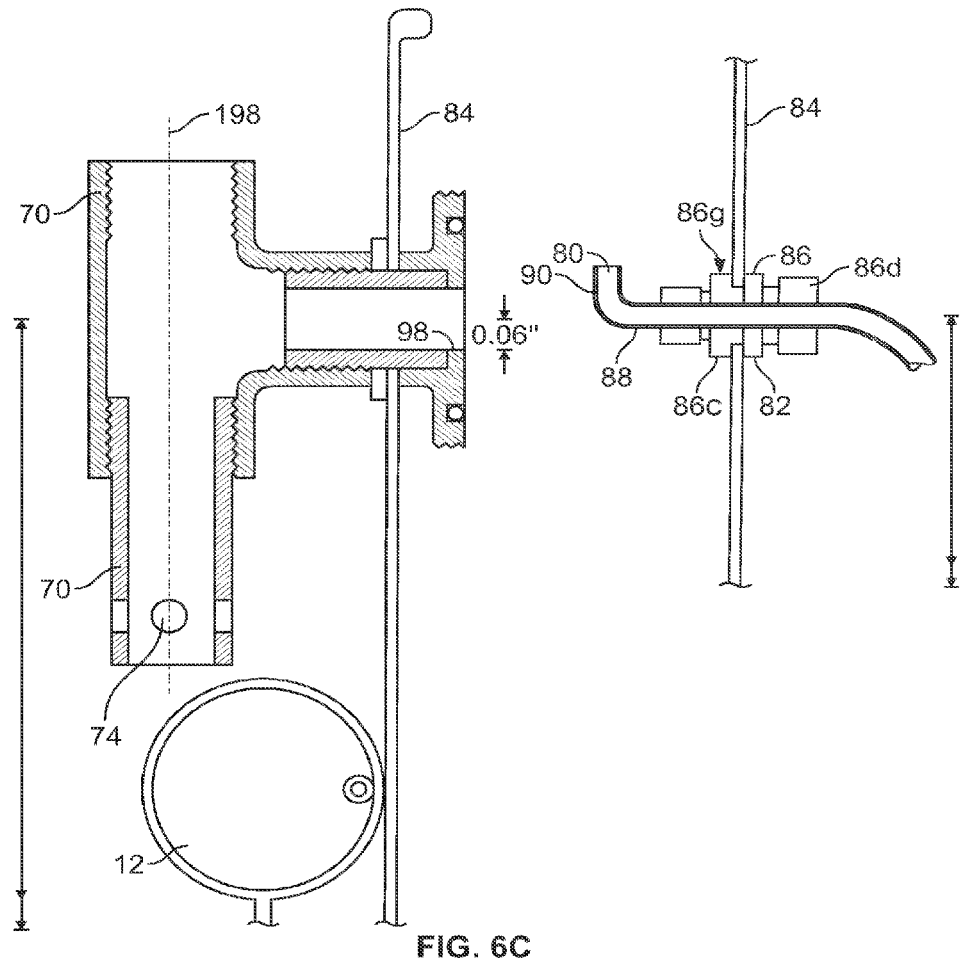
FIG. 6C is a schematic representation of one embodiment of the second outlet of the device of the present invention.

FIG. 6C shows that in one preferred embodiment the free open end 90 of the rigid tube 88 is approximately 0.6" above the centerline height 198 (FIG. 6C) of the transfer tube assembly 67. It will be understood that as coalesced oil is released, by the filter inside the filter canister, it floats to the surface 93. The tee 70 prevents the floating oil 100 from passing into the transfer tube assembly 67. As the amount of floating oil 100 gets deeper, the fluid level inside the filter canister 52 rises. Once the fluid level 100 reaches the free open end 90 of the rigid tube 80, any additional accumulated oil 102 will overflow into the rigid tube 80 at opening 90 and pass through the bulkhead fitting 86, within the flexible outlet tube 92, and into the oil trap 54. In a preferred embodiment, the length of the downward directed pipe 72 attached to the filter canister outlet tee 70 is of a sufficient length such that the floating oil 102 will overflow into the tube 80 before the depth of the accumulated oil 102 reaches the bottom opening 73 of the downward directed pipe 72. The length of the downward directed pipe 72 in one preferred embodiment is approximately 6 inches and in another preferred embodiment it is 12 inches.

Figure 6D:
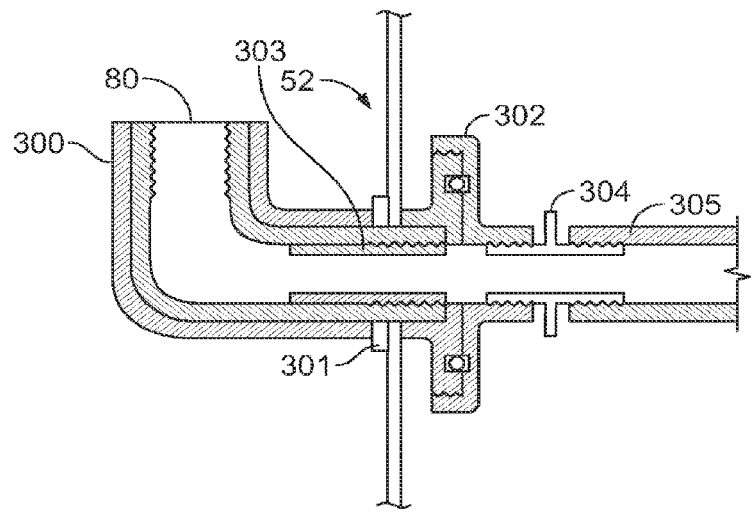
FIG. 6D is a representation of one embodiment of the second outlet of the device of the present invention.

FIG. 6D shows that in another preferred embodiment the secondary outlet consists of an elbow 300 sealed to the inside of the filter reservoir 52 by means of a gasket 301 and connected to a ½" PVC pipe union fitting 302 by means of a PVC nipple 303 which is solvent welded to the elbow 300 and threaded into the union 302. A ½" inner diameter by ¾" outer diameter clear vinyl tube 305 is connected to the union 302 by means of a barb fitting 304. Similar to the manner shown in FIG. 6A, the vinyl tube 305 passes into the oil trap 54 through a hole 94 defined in the oil trap lid 54T.

Figure 6E:
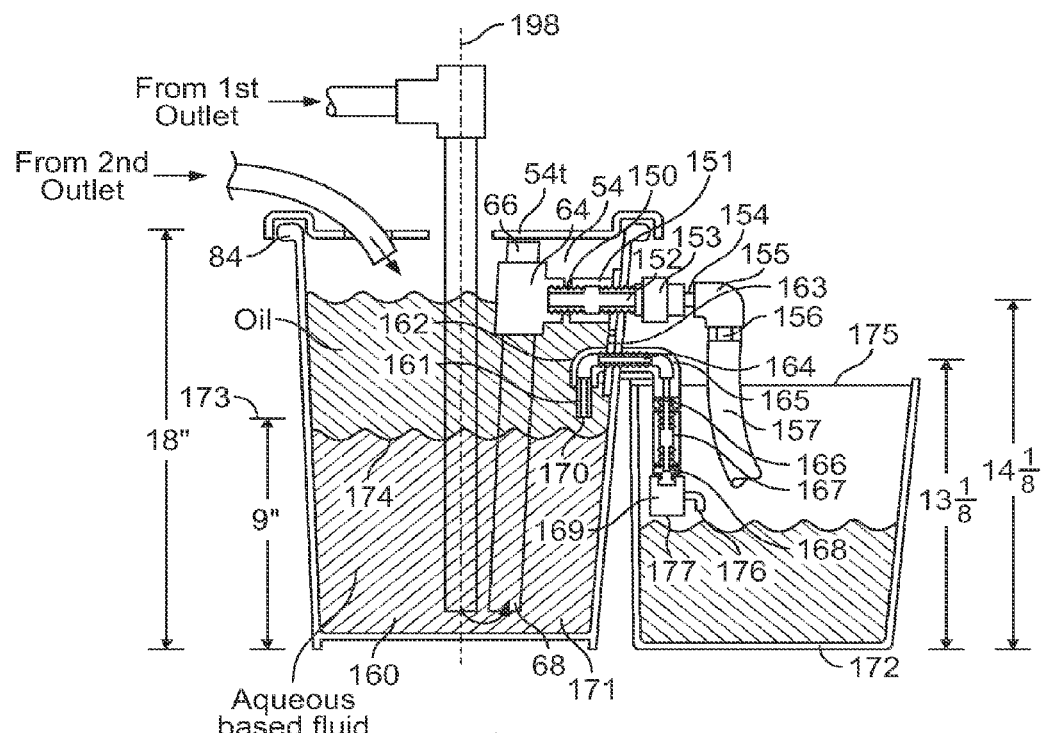
FIG. 6E is a representation of one embodiment of a drainage valve system for the second container.

FIG. 6E shows the addition of a drain valve 169 capable of draining the upper lighter oil. The figure shows the valve 169 connected to a barb fitting 168 attached to a hose 167 attached to an elbow 165 with ½ NPT thread barb fitting 166. The other end of the elbow 165 is connected by a solvent weld to a nipple 164 with ½ NPT threads on one end which is threaded to an elbow 162 which is inturn threaded to a 1½" nipple 161. A gasket 163 is trapped between the elbow 162 and the second container 84. Opening the valve will drain the contents of the second container above the bottom opening 170 of the nipple 161 down to the bottom opening 170 of the nipple 161. If the valve 169 is opened when the bottom of the oil layer is below the bottom opening 170 of the short nipple 161, then only oil will be removed through the valve 169. The drain valve discharge 177 is below the nipple 161 inlet 170 such that a siphoning action is created until the oil level in the oil trap 54 drops to the level 173 of the inlet 170 at which time the siphon will be broken and the flow will abruptly cease. The siphoning ability allows the height of the drainage receiving container 172 to have an upper opening 175 above the siphoning breakage level 173 so that the receiving container 172 will be easy to handle without spillage.

Figure 6F:
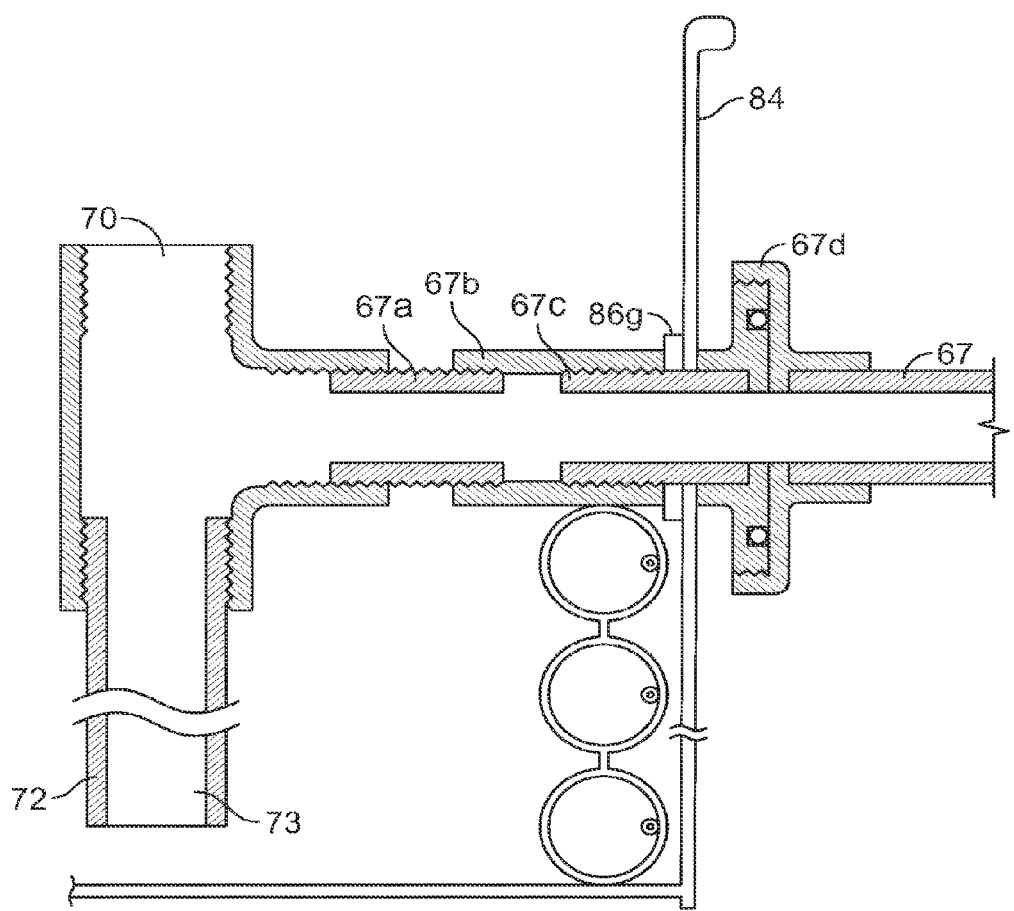
FIG. 6F is a sectional view of another embodiment of the improved filter of the present invention.

Referring to FIG. 6F, it can be seen that in one preferred embodiment of the device of the present invention, oil once split off from the aqueous fluid is allowed to accumulate in the oil trap along with the aqueous fluid via separate paths. Advantageously, such a configuration prevents the coalesced de-emulsified oil produced by the filter 12 from flowing with the aqueous fluid and becoming partially re-emulsified.

It can be seen, in FIG. 6F, which is a preferred embodiment similar to the embodiment of 6A, that an outlet tee 70 comprises a downward directed length of pipe 72 with the bottom opening 73 preferably near the bottom of the canister 84. The pipe 72 may have holes or slots 74 to help insure that aqueous fluid is able to enter the pipe 72 even if the coiled filter material inside the filter canister shifts and blocks the bottom opening 73 at the end of the pipe 72. The aqueous fluid that enters the pipe 72 passes through the tee 70 and into the transfer tube assembly 67 made up of sectional pipe portions 67a, 67b and 67c. Pipe 67 is designed so that outlet tee 70 can be positioned correctly within canister 84 and so that the pipe is reliably sealed with bulkhead gasket 86g. The transfer tube assembly 67 has a downwardly directed pipe 71 that, in a preferred embodiment has a length of approximately 16". It will be understood by persons having ordinary skill in the art that the length of pipe 71, and the other pipes and conduits, as well as their diameters and other specifications, will depend on the concomitant sizes, shapes and specifications, of the other parts and equipment used in a configuration of the particular embodiment of the device. The use of different sized pipes, conduits and other equipment, as well as the specifications for materials and connections, are contemplated in the present invention and their uses are not a departure from the novel scope of the present invention.

Figure 7A:
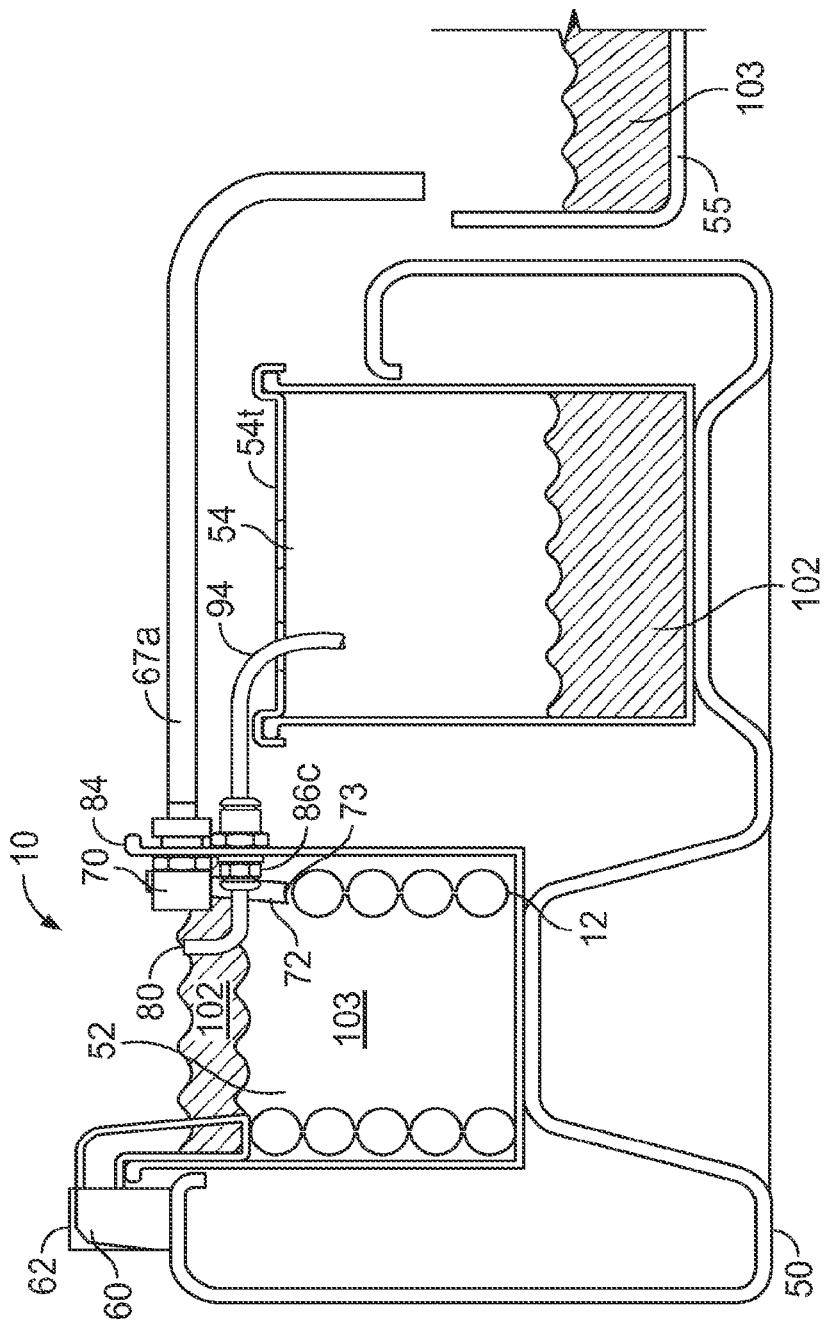
FIG. 7A is a sectional view of another embodiment of the device of the present invention.
Figure 7B:
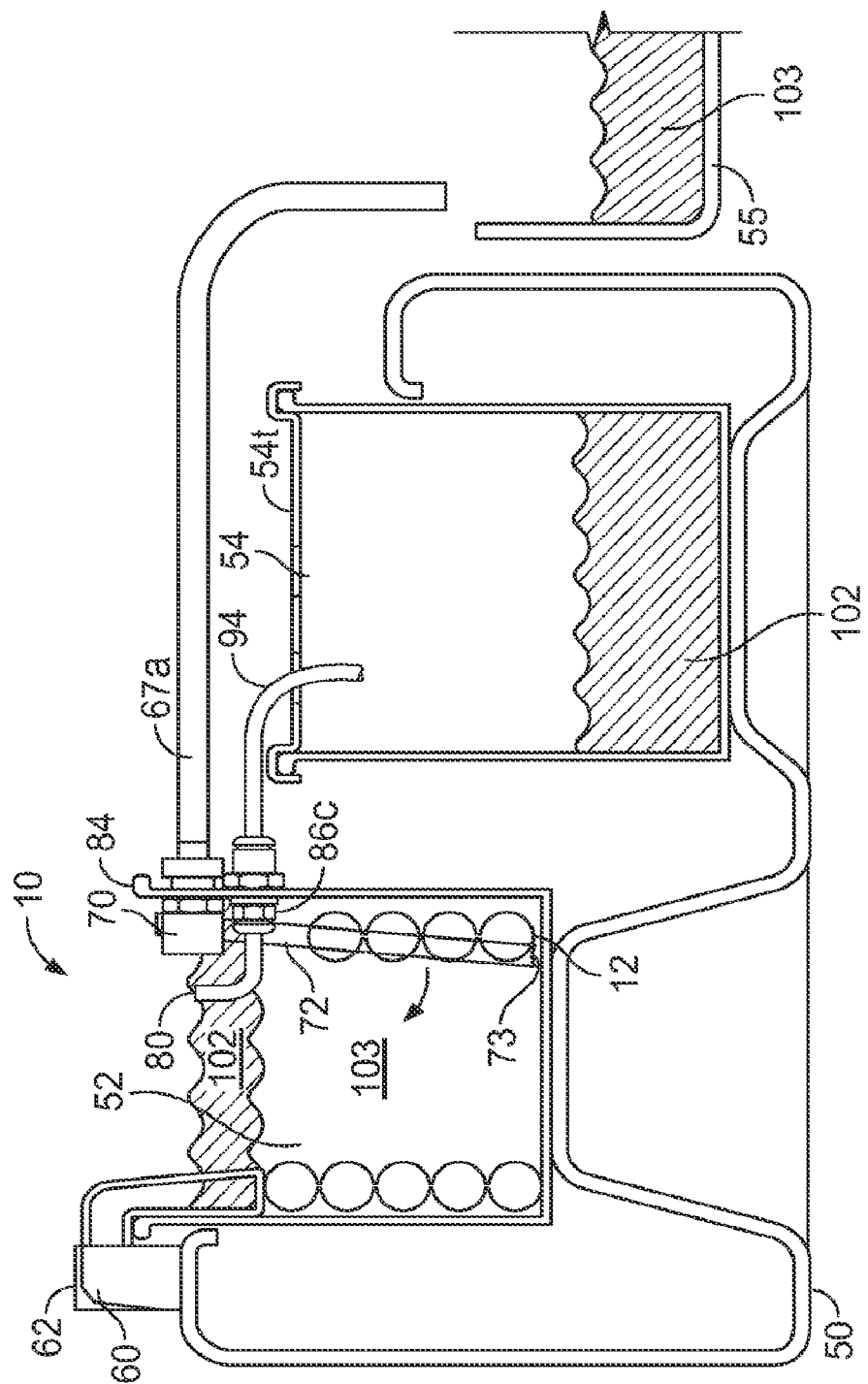
FIG. 7B is a sectional view of another embodiment of the device of the present invention.

FIGS. 7A and 7B show other embodiments in which the oil 102 once split off from the aqueous fluid 103 accumulates in the oil trap 54 while the aqueous fluid returns directly from the filter canister 52 back to the aqueous fluid sump 55. The embodiment of FIG. 7A is one alternative configuration in which the aqueous fluid in the filter canister passes through the first opening 73 directly back to the sump 55 while the oil 102 from the second outlet 80 passes into the oil trap 54. FIG. 7B is another embodiment that shows an elongation in pipe 72, such that fluid is removed from the bottom of a canister, rather than from a midpoint.

In FIG. 7A the transfer tube assembly 67 (FIG. 6A) has been replaced by an outlet hose 67d that empties directly into the aqueous fluid sump 55. Further, the accumulated oil 102 that discharges through the secondary outlet 80 in the embodiment of FIG. 6A, now, in the present embodiment, accumulates by itself inside the oil trap 54. Further, oil 102 accumulates from the bottom of oil trap 54 up, rather than from the top down as in the configuration shown in FIGS. 6A and 6F. In the first preferred embodiment (FIG. 6A, 6F) the oil and aqueous fluid are permitted to statically accumulate together. The configuration (FIG. 6A, 6F) has the advantage of permitting the oil to accumulate from the top down so as to give a good visual indication of the rate at which oil is being accumulated. In one configuration of the present embodiment the oil trap 54 is constructed, in part, with a semi-transparent materials so that the oil trap canister can be inspected visually. It will be understood by persons having skill in the art that any type of visual inspection mechanism or materials can be substituted without departing from the novel scope of the present invention.

As will be understood, the configuration shown in FIGS. 6A and 6F allow any loosely emulsified oils or any oils that may migrate into the bottom opening 73 of the downward directed pipe 72 to continue to coalesce and separate inside the oil trap 54. In contrast, in the embodiment of FIG. 7, contact between the accumulated coalesced de-emulsified oil 102 in the filter canister 54 and the aqueous fluid 103 is eliminated in order to prevent any possibility of any partial re-emulsification. Since only oil 102 enters the oil trap 54 and there is no outlet hose on the oil trap, the oil trap turns into an oil accumulation canister.

Figure 8A:
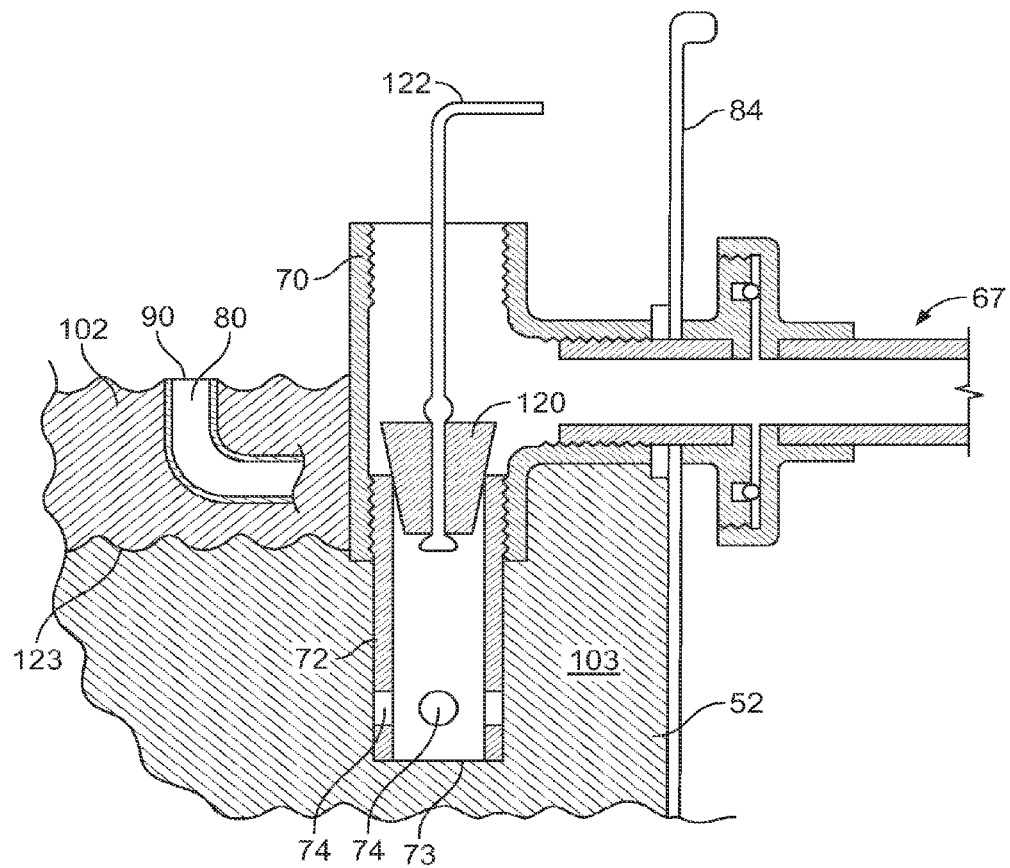
FIG. 8A is a sectional view of one method of removing coalesced oil from the device of the present invention during servicing.
Figure 8B:
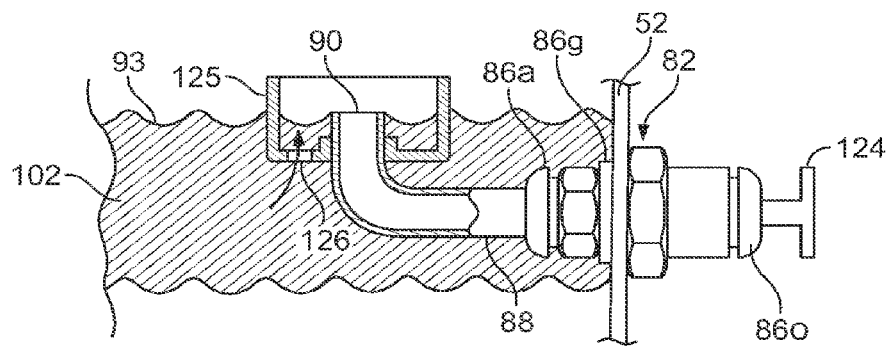
FIG. 8B is a sectional view of a shield to prevent blockage of the secondary outlet due to floating debris.
Figure 8C:
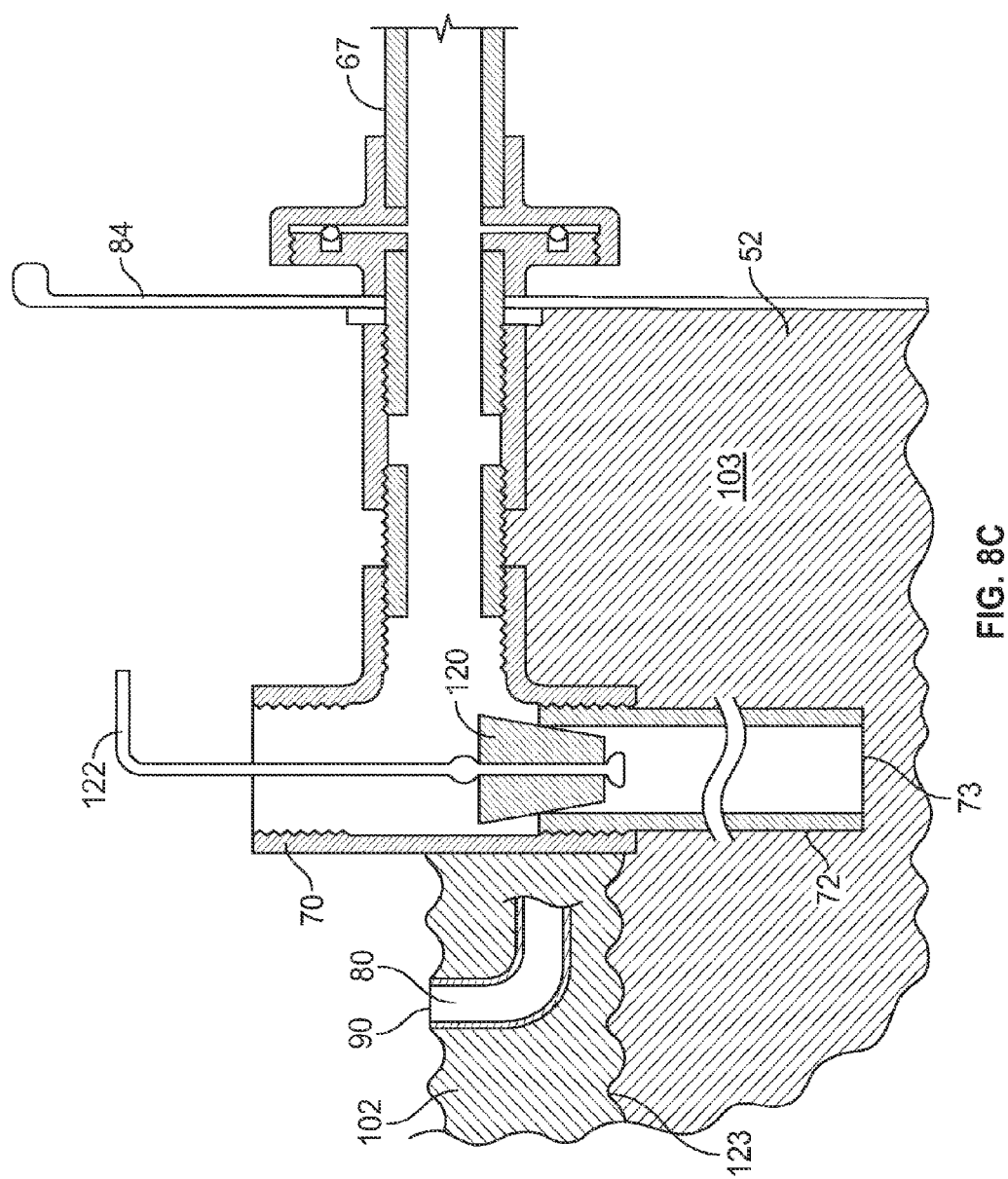
FIG. 8C is a sectional view of another method of removing coalesced oil from the device of the present invention during servicing.

FIGS. 8A and 8C show a device and method for stopping the flow of fluids so as to remove the accumulate oil from filter canister 52 during servicing. Referring now to FIG. 8A, and to FIG. 8C, a typical configuration for the tee 70 and transfer tube assembly 67, of the device of the present invention, is illustrated. FIG. 8C, like FIG. 6F, merely includes those elements that permit the placement of tee 70 within the canister so that pipe 72 can be extended to a lower level of canister 84. Like elements of FIG. 8C have been numbered to correspond with like elements in FIGS. 6F and 7B.

Referring again to FIG. 8A, in a preferred embodiment, a stopper 120 is shown with a handle 122, stopper 120 is provided to be used to temporarily block the flow of the aqueous fluid 103 from the filter canister 52 through the tee 70 into the transfer tube assembly 67, just prior to filter canister changeout. When stopper 120 is pressed into tee 70, such that pipe 72 is blocked, the aqueous fluid level, denoted by number 123 in FIG. 8A, inside the filter canister 52 will rise as a result of the continued inflow of fluid and the blocking off of the fluid's egress. The rise of the fluid level 123, causes oil 102 to rise and overflow into the rigid tube 80, through opening 90, and then, through operation of the device of the present invention, into the oil trap 54, as described above. In this manner the accumulated oil 102 in the filter canister 52 can be removed prior to transferring the filtered aqueous fluid 102 from a used filter canister 52 into the replacement filter canister, during filter service changeout. Such removal is required as it is believed that particulate, and possibly bacteria, may accumulate in the accumulated oil and therefore should be removed during filter canister changeout.

FIG. 8B illustrates that during service of oil trap 54, flexible outlet tube 92 (FIG. 6A) can be removed and replaced with a shipping plug 124. Likewise the union fitting 302 shown in FIG. 6D can be disconnected and fitted with a shipping cap (not shown). Further, in one embodiment an optional shield 125 attached to the open end of the rigid tube 88 to shield the opening 90 from any floating debris, such as congealed oil, that could plug the opening 90 to the rigid tube 88. The illustrated shield 125 comprises a series of annular slots 126 that permit accumulated oil 102 to enter the shield 125 from below the surface of the accumulated oil 102. In this manner, typically only liquid oil can pass into overflow 80. It will be understood by persons having ordinary skill in the art that openings having other shapes and dimensions can be employed in shield 125 without departing from the novel scope of the present invention.

Figure 9:
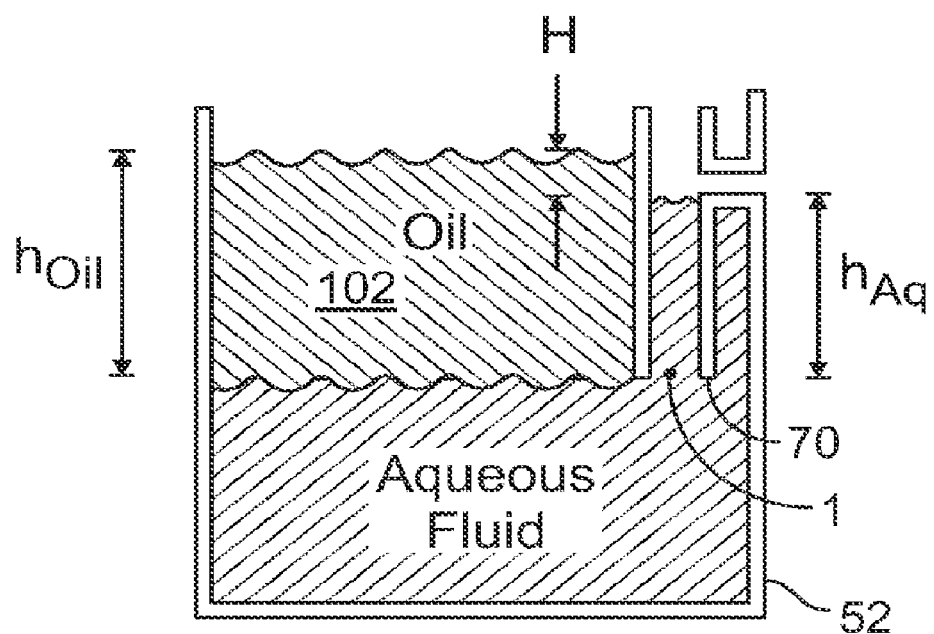
FIG. 9 is a schematic representation of the height differential principle of one embodiment of the device of the present invention.

FIG. 9 is a schematic provided to explain the height differential principal employed in the device of the present invention. Referring to FIG. 9, the height differential in the filter canister 52, that is when the depth of oil is equal to the depth of the bottom opening of the downward directed pipe connected to the primary outlet of the filter canister 52, is shown. It will be understood that without any oil in the filter canister 52, the fluid level inside the filter canister 52 will be equal to the level of the primary outlet opening in the filter canister 52 as that opening acts to drain any fluid higher than that level. However, because oil is less dense (specific gravity of approximately 0.8), and as oil accumulates in the filter canister 52, the fluid height in the filter canister will rise in order to balance the static pressure at the opening, at the bottom of the downward directed outlet pipe 70, in the filter canister (shown as point 1). That is, the static pressure due to the height of the aqueous fluid in the downward directed outlet pipe must equal the pressure due to the height of the fluid inside the filter canister.

As shown in FIG. 9, all the fluid generating the static pressure inside the filter canister at point 1, that is all the fluid above point 1, is lighter density oil 102; therefore, the total height of fluid inside the filter canister 52 must be higher than the fluid inside the downward directed outlet pipe 70. FIG. 9 includes the equations that shows the derivation of the difference in height (H) of the fluid inside the filter canister 52 and the height of the fluid in the downward directed outlet pipe. It will be understood that the height differential is equal to the density ratio of the Aqueous Fluid to the Oil minus 1 times the height of the Aqueous Fluid column inside the downward directed outlet pipe. For example, if the density of the Aqueous Fluid is 1.0" and the density of the Oil is 0.8, and the height of the Aqueous Fluid column is 2.0", the height differential is 0.5".

The above-described configurations optimize the features of the de-emulsifying/coalescing coiled tubular filter configuration by providing a flow path which continually skims off any coalesced oils and deposits them in a location and form for easy removal during service. The exemplary illustrated configurations use low flow rate and low pressure drop filtration configurations, which are more efficient in removing particles and emulsified oils than known high flow rate and high pressure drop filtration systems.

The present configurations operate on the principle that waste streams such as soluble oil coolants, aqueous parts cleaning fluids, vibratory finishing systems, used mop water, and air compressor condensate have the ability to loosely emulsify oils from machine lubrication systems, cutting/forming oils from previous machining operations, hydraulic oils, etc. By continually de-emulsifying, coalescing and removing the unwanted loosely emulsified oils, the quality of the process fluid is continually maintained for reuse or proper discharge to the sewer. Furthermore, by continually removing loosely emulsified oils in the fluid, the loosely emulsified oils are not allowed to accumulate in the fluid and later separate out when not in use. It is also important to note that stagnant layers of oil on top of aqueous fluids prevent oxygen from coming into contact with the aqueous fluid. This provides an environment for the buildup of anaerobic bacteria often associated with rancid or foul smells.

The proposed de-emulsifying/coalescing filter uses a polymer, such as polypropylene, that has a surface tension that wets (adsorbs) oils and repels water. A filter media of many fine fibers of polypropylene therefore provides a good surface to de-emulsify and coalesce oils from droplets of aqueous fluid that have oil on the outside and water on the inside (water-in-oil emulsions). These characteristics are often associated with unwanted oils picked up by aqueous solutions such as coolants and air compressor condensates. Likewise, such a filter media passes aqueous fluids that have oil on the inside and water on the outside (oil-in-water emulsions) often associated with stable soluble oil coolants (milky white in color) and semi-synthetic coolants (cloudy in color). In this manner the filter, coupled with low shear stresses due to low pressures and velocities, can effectively remove unwanted oils from fluids without removing the desired soluble oils such as those found in coolant formulations.

It has been found that the present configurations use the natural ability of the polypropylene coiled tubular filter configuration to de-emulsify and coalesce oils and makes use of gravity to facilitate separating and accumulating the coalesced oils, in a container, for ease of removal. A present system can be provided in a modular design having a relatively small footprint, which provides a cost effective, machine-dedicated system for example, for parts cleaners, machine tools and the like. Moreover, the present de-emulsifying/coalescing coiled tubular filter system is less susceptible to fouling and bacteria colonization than membrane filters because the coalesced oil, aqueous fluid, and any bacteria pass through the filter.

Without being held to the specifics of the phenomena occurring, it is believed that the microfiber of the filter material strips off the emulsified oil from the oil-in-water micelle by adsorbing the oil onto the tiny fibers. The adsorbed oil then gradually coalesces and migrates through the filter media forming droplets on the outer surface of the filter media which eventually release and float to the surface. The oil coated microfibers also provide a good "sticky" surface for adhering small particles (smaller than the 19 micron 95 percent filtration efficiency of the microfiber filter material). The small particles entrained in the oil also migrate with the oil and become trapped in the subsequently coalesced oil droplets which are eventually separated out from the oil-in-water desirable emulsion. As such, it has been found that the present filtration system efficiently removes particles smaller than the rated filtration efficiency of the microfiber filter media. In addition, because the small particles are trapped by, and migrate with, the de-emulsified oil, the particles do not accumulate in the filter and therefore do not decrease the filter life.

Advantageously, it has been found that the present filter system does not significantly raise the temperature of the fluid. Oil de-emulsifying and coalescing followed by cascade oil trap separation separates the coalesced oils from the aqueous fluid rather than concentrates the separated emulsion. During routine service the only waste materials generated are accumulated oil and filter element. The proposed de-emulsifying/coalescing coiled tubular filter can effectively coalesce unwanted oil present in water-in-oil emulsions without breaking down desirable oil-in-water emulsions found in soluble oil and semi-synthetic coolants. It has also been found that the present de-emulsifying/coalescing coiled tubular filtration systems continuously removes emulsified tramp oils as they are forming, to eliminate the accumulation of unwanted oils in an aqueous fluid sump or bath. By removing unwanted oils and suspended particles as they are introduced, the unwanted cumulative effects, such as colonization of anaerobic bacteria, caked floating scum, food for general bacteria, particles for bacteria colonization and resulting degradation of the cooling and machining enhancement properties of the coolant, are eliminated or greatly minimized. The proposed filtration system actually uses the ability of the aqueous fluid to emulsify unwanted oils to help eliminate them.

The proposed filtration system helps stabilize the dynamic relationship between contaminant oil, suspended particles, pH, and oil-in-water concentration as measured by refractometers. The presence of non-oil-in-water emulsified oil becomes food for bacteria growth. The presence of suspended particles becomes sites for bacteria colonization and migration. Excessive bacteria leads to a reduction in pH due to the acidic by-products of bacteria colonization. Reduced pH leads to de-emulsification of the desired oil-in-water emulsion, which leads to the liberation of more free oil, which further feeds bacteria growth, etc. The removal of non-oil-in-water emulsified oils and suspended particles reverses the process and stabilizes the coolant pH, refractometer readings, and bacteria count.

The natural tendency of heavier and lighter fluids to separate is exploited in the device of the present invention to more efficiently filter unwanted oil from more desirable fluids. Utilizing the tendency for oil to rise above water, employing an outlet pipe and fixtures to "skim" the oil from the surface of the combined fluid in a tank, and transferring the fluids into different areas of one tank, or into different tanks, in accordance with their specific gravity, lessens the likelihood of re-emulsification, or other contamination, of one fluid with the other.

The ability of fluids to siphon is exploited in the device of the present invention to efficiently remove only the accumulated lighter oil in the second container employing a drain valve connected to a downward directed pipe inside the container such that fluid can be siphoned down to a level below the height of the drainage fitting and then abruptly stop flowing.

All patents referred to herein, are hereby incorporated herein by reference, whether or not specifically do so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred.

What is claimed is:

1. A filter system for receiving an emulsified contaminant laden liquid system having a desired liquid and contaminants and separating the desired liquid from the contaminants, comprising:
    an inlet for receiving the emulsified contaminant laden liquid system;
    a filter element in fluid flow communication with the inlet, the filter element de-emulsifying the emulsified contaminant laden liquid system into the desired liquid and the contaminant, separating the desired liquid from the contaminant and passing the desired liquid and the contaminant;
    a first tank for supporting the filter element, the first tank further configured to hold a quantity of the desired liquid and the contaminant separated from one another;
    a second tank configured to hold a heavier desired fluid and a lighter contaminant in suspended separation;
    a first overflow tube for passing the heavier desired fluid from the first tank to the second tank and a second overflow tube for passing a lighter contaminant from the first tank to the second tank;
    the second tank having a liquid separation assembly for passing the heavier desired fluid and retaining the lighter contaminant.

2. The filter system in accordance with claim 1 wherein the second overflow tube comprises a pipe having a first and second end, the first end having an elbow shape, the first end facing generally up and being placed above the surface of the liquid, the second end of the pipe extending into the second tank.

3. The filter system in accordance with claim 2, wherein the second end opening of the second overflow pipe is placed into the second tank near the upper surface of the second tank, so that the lighter fluid is dispensed into the tank such that mixing of the fluids is minimized.

4. The filter system in accordance with claim 1 wherein the first overflow tube comprises a pipe having a first and second end, the second end of the pipe extending into the second tank such that its mouth is near the bottom of the tank.

5. The filter system in accordance with claim 1 wherein the filter media has an inner filter element and an outer filter element.

6. The filter system in accordance with claim 5 wherein the inner filter media is a needle punch polypropylene felt.

7. The filter system in accordance with claim 5 wherein the outer filter media is a polypropylene microfiber material.

8. The filter system in accordance with claim 7 wherein the inner filter media is a 95 percent single pass efficiency 48 micron, 5 micron nominal filtering material.

9. The filter system in accordance with claim 8 wherein the outer filter media is a 95 percent single pass efficiency 19 micron filtering material.

10. The filter system in accordance with claim 5 including a porous material surrounding the outer filter media.

11. The filter system in accordance with claim 10 wherein the porous material surrounding the outer filter media is a spunbond polypropylene.

12. The filter system in accordance with claim 1 wherein the second tank liquid separation assembly is an oil separator having a vertical conduit extending to about a bottom of the tank and a tee in flow communication with the vertical conduit, the tee providing flow communication from the second tank, and wherein the heavier liquid is free to pass into the vertical conduit, into the tee and out of the second tank, the lighter liquid being retained in the second tank.

13. The filter system in accordance with claim 1 including an over-pressurization arrangement to prevent over-pressurizing the filter media.

14. The filter system in accordance with claim 1 wherein the filter system is configured to separate an emulsified oil from an aqueous-based fluid and to removed the aqueous-based fluid from the oil.

15. A filter system for receiving an aqueous-based fluid contaminated with particles and an emulsified contaminant oil, and separating the emulsified contaminant oil and particles from the aqueous-based fluid, comprising:
    a filter media for receiving the aqueous-based fluid and emulsified contaminant oil, the filter media having an inner filter element formed from a 95 percent single pass efficiency 48 micron, 5 micron nominal filtering material of needle punch polypropylene felt, an outer filter element formed from a 95 percent single pass efficiency 19 micron filtering material filtering material of a polypropylene microfiber material and a porous spunbond polypropylene surrounding the outer filter media, the filter element removing particles and de-emulsifying the emulsified contaminant oil from the aqueous-based fluid into the contaminant oil and the aqueous-based fluid, coalescing the de-emulsified contaminant oil, separating the coalesced de-emulsified contaminant oil from the aqueous-based fluid, and passing the coalesced de-emulsified contaminant oil and the aqueous-based fluid;
    a first tank for supporting the filter element, the first tank further configured to hold a quantity of the separated de-emulsified contaminant oil and the aqueous-based fluid separated from one another;
    a second tank configured to hold the separated de-emulsified and coalesced contaminant oil and the aqueous-based fluid aqueous solution in suspended separation;
    a first overflow tube for passing the separated aqueous-based fluid from the first tank to the second tank and a second overflow tube for passing the separated de-emulsified and coalesced contaminant oil from the first tank to the second tank;
    the second tank having an oil separation assembly for removing the aqueous-based fluid from the contaminant oil and passing the aqueous-based fluid therefrom.

16. The filter system in accordance with claim 15 wherein the oil separation assembly includes a vertical conduit extending to about a bottom of the tank and a tee in flow communication with the vertical conduit, the tee providing flow communication from the second tank, and wherein the aqueous-based fluid is free to pass into the vertical conduit, into the tee and out of the second tank, the lighter liquid being retained in the second tank.

17. The filter system in accordance with claim 15 including an over-pressurization arrangement to prevent over-pressurizing the filter media.

18. The filter system in accordance with claim 15 wherein the aqueous-based fluid is an oil-in-water emulsion.

19. The filter system in accordance with claim 15 including a means to manually drain off the separated de-emulsified and coalesced contaminant oil in the second tank.

* * * * *

UNITED STATES PATENT AND TRADEMARK OFFICE
CERTIFICATE OF CORRECTION

PATENT NO. : 7,300,575 B2  
APPLICATION NO. : 10/869278  
DATED : November 27, 2007  
INVENTOR(S) : Larson Page 1 of 1

It is certified that error appears in the above-identified patent and that said Letters Patent is hereby corrected as shown below:

Col. 14, Line 19-20

Claim 14, lines 3 and 4 should read:

--from an aqueous-based fluid and to remove the aqueous-based fluid from the oil.--

Col. 14, Line 33

Claim 15, line 11 should read:

--efficiency 19 micron filtering material--

Signed and Sealed this

Twenty-fifth Day of March, 2008

JON W. DUDAS  
*Director of the United States Patent and Trademark Office*